United States Patent
Pearson et al.

(10) Patent No.: US 10,482,278 B2
(45) Date of Patent: *Nov. 19, 2019

(54) REMOTE PROVISIONING AND AUTHENTICATED WRITES TO SECURE STORAGE DEVICES

(71) Applicant: McAfee, LLC, Santa Clara, CA (US)

(72) Inventors: Adrian R. Pearson, Hillsboro, OR (US); Sergiu D. Ghetie, Hillsboro, OR (US); Thomas R. Bowen, Albuquerque, NM (US); Gamil A. Cain, El Dorado Hills, CA (US); Jason Cox, Longmont, CO (US); Faraz A. Siddiqi, Portland, OR (US); Neeraj S. Upasani, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,315

(22) Filed: Mar. 8, 2019

(65) Prior Publication Data
US 2019/0205560 A1 Jul. 4, 2019

Related U.S. Application Data

(63) Continuation of application No. 15/089,083, filed on Apr. 1, 2016, now Pat. No. 10,229,281.

(60) Provisional application No. 62/240,892, filed on Oct. 13, 2015.

(51) Int. Cl.
G06F 21/62 (2013.01)
G06F 21/57 (2013.01)
G06F 21/79 (2013.01)

(52) U.S. Cl.
CPC ........ *G06F 21/6218* (2013.01); *G06F 21/575* (2013.01); *G06F 21/79* (2013.01); *G06F 2221/2107* (2013.01)

(58) Field of Classification Search
CPC .................................................. G06F 21/6218
See application file for complete search history.

(56) References Cited

U.S. PATENT DOCUMENTS

2007/0055837 A1 3/2007 Rajagopal et al.
2009/0031292 A1 1/2009 Fulton et al.
2011/0177866 A1 7/2011 Kim
(Continued)

OTHER PUBLICATIONS

International Search Report and Written Opinion dated Dec. 1, 2016 in International Patent Application No. PCT/US2016/050980.
(Continued)

*Primary Examiner* — Simon P Kanaan
(74) *Attorney, Agent, or Firm* — Byrne Poh LLP

(57) ABSTRACT

A system for securing electronic devices includes a storage device including a storage device controller processor, at least one non-transitory machine readable storage medium in firmware of the storage device communicatively coupled to the storage device controller processor, and a monitor application comprising computer-executable instructions on the medium. The instructions are readable by the storage device controller processor. The monitor application is configured to provision one or more read-only areas of the storage device, provision a candidate copy area of the storage device, reduce a maximum capacity available for user data on the storage device by a size of the read-only areas and the candidate copy area, and secure access to the read-only areas of the storage device.

20 Claims, 6 Drawing Sheets

(56) References Cited

U.S. PATENT DOCUMENTS

| | | |
|---|---|---|
| 2012/0254629 A1 | 10/2012 | Zipperer et al. |
| 2014/0310800 A1 | 10/2014 | Kabra et al. |
| 2014/0337918 A1 | 11/2014 | Siddiqi et al. |
| 2014/0351789 A1 | 11/2014 | Elias et al. |

OTHER PUBLICATIONS

Notice of Allowance dated Oct. 26, 2018 in U.S. Appl. No. 15/089,083.
Office Action dated May 16, 2018 in U.S. Appl. No. 15/089,083.
Office Action dated Oct. 5, 2017 in U.S. Appl. No. 15/089,083.

REMOTE PROVISIONING AND AUTHENTICATED WRITES TO SECURE STORAGE DEVICES

CROSS-REFERENCE TO RELATED APPLICATIONS

This application is a continuation of U.S. patent application Ser. No. 15/089,083, filed Apr. 1, 2016, which claims the benefit of U.S. Provisional Application No. 62/240,892, filed Oct. 13, 2015, each of which is hereby incorporated by reference herein in its entirety.

TECHNICAL FIELD

The present disclosure pertains to the field of electronic device security and, more particularly, to a system and method for end-point visibility.

DESCRIPTION OF RELATED ART

When compromised, electronic content might be restored to servers, computers, and other machines. Attempts to recover and restore electronic content may include reimaging each such machine. The attempts to recover and restore electronic content may be made from centralized servers or machines. The centralized servers or machines themselves may be compromised and restoration of client machines may be performed by hand. The restoration effort for many different clients may share network bandwidth. Some restoration may be performed offline, without taking advantage of the network.

BRIEF DESCRIPTION OF THE DRAWINGS

For a more complete understanding of embodiments of the present disclosure and its features and advantages, reference is now made to the following description, taken in conjunction with the accompanying drawings, in which.

DETAILED DESCRIPTION

Figure 1:
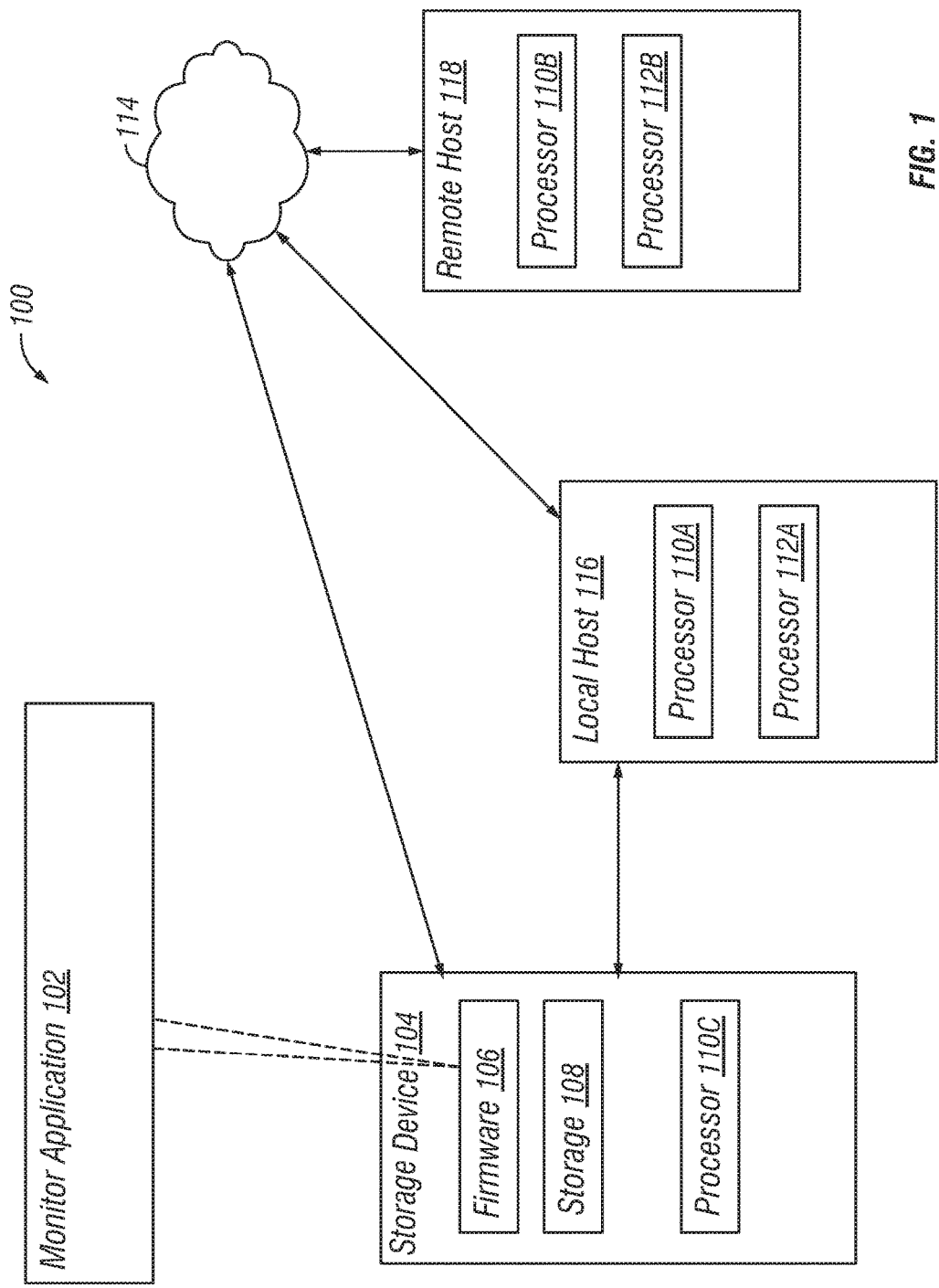
FIG. 1 illustrates an example embodiment of a system for writing to storage devices, according to embodiments of the present disclosure.

FIG. 1 illustrates an example embodiment of a system 100 for writing to storage devices, according to embodiments of the present disclosure. In one embodiment, the writes may be authenticated. In another embodiment, the authenticated writes may be to secure storage devices. In yet another embodiment, system 100 may allow provisioning, including remote provisioning, for the storage device.

Provisioning and authentication may be performed by any suitable part of system 100. In one embodiment, various operations of provisioning and authentication may be provided by a monitor application 102 in system 100. While a single instance of monitor application 102 is shown in FIG. 1 and described below, the functionality described herein for monitor application 102 may be suitably implemented in any number of instances or types applications.

Monitor application 102 may be implemented in any suitable manner, such as by a program, application, script, function, library, code, software, firmware, hardware, or other mechanisms for carrying out the functionality described herein. Moreover, monitor application 102 may be implemented in any suitable portion of system 100. For example, monitor application 102 may be implemented in firmware 106 of a storage device 104 for which it will provision and authenticate writes. Some portions or functionality of monitor application 102 may be implemented in a local host 116 that might access storage device 104. Local host 116 may include any suitable electronic device, such as a server, blade, computer, laptop, mobile device, or tablet. Local host 116 may be communicatively coupled to storage device 104 by, for example, an internal or external bus, network connection, or other suitable mechanism. In some embodiments, storage device 104 may be implemented within local host 116. Some portions or functionality of monitor application 102 might be implemented in a remote host 118 that might access storage device 104. Remote host 118 may include any suitable electronic device, such as a server, blade, computer, laptop, mobile device, or tablet. Firmware 106 may be resident on a non-transitory computer readable medium, and instructions contained therein for monitor application 102 may be executed by a processor 110C. Remote host 118 may be remote in that it is communicatively coupled to storage device 104 or local host 116 through a network. Each of local host 116 and remote host 118 may include a processor 112 communicatively coupled to a memory 110.

In one embodiment, monitor application 102 may provision the configuration of storage of storage device 104. In another embodiment, monitor application 102 may authenticate writes made by elements accessing storage device 104, such as applications within local host 116 or remote host 118.

Storage device 104 itself may be implemented as a stand-alone device or within a larger system such as a server farm, blade, redundant array of disks, or other suitable configuration. Furthermore, storage device 104 itself may be implemented within local host 116. In one embodiment, storage device 104 may be implemented as a self-encrypting device (SED). In another embodiment, storage device 104 may be implemented as a solid state disk (SSD). Reads and writes of content of storage device 104 may be made from, for example, applications in the local or remote hosts.

Storage device 104 may employ a storage device unlock procedure. The procedure may provide assurance that an attacker, based in the local or remote hosts, that gains access to storage device 104 when storage device 104 is powered off will not be able to recover any valuable data. The protection of storage device 104 in this state may be referred to as "data at rest" protection. The procedure may include, for example, an Advanced Technology Attachment (ATA) security procedure, Trusted Computing Group (TCG) Opal framework, or TCG enterprise framework. The procedure may be performed upon a cold boot.

However, after a user is authenticated or a readable/writeable portion of storage device 104 is unlocked, there may be no additional protections of data written to the readable and writeable portions of the storage. In some cases, such as in operating system (OS) recovery partitions, monitor application 102 may allow an update to a read-only region of storage device 104 in a verified manner. Without such verification, malware might overwrite portions of storage device 104 to insert, for example, rootkits, advanced persistent threats, or take control of a software stack entirely.

In one embodiment, monitor application 102 may verify updates that occur to the operating system recovery image as it resides on storage device 104. In other embodiments, monitor application 102 may verify updates or changes to other portions of storage device 104. Any suitable portion of storage device 104 may be tracked. Monitor application 102 may do this, for example, in order to provide the ability to update a read-only portion of storage device 104 while also preventing malware attacks. If verification of image updates or other portions of storage device 104 occur in a platform or operating system level of, for example, the local or remote host, malware might be able to insert itself lower in the software stack than the verification code. In another example, malware might be able to run at a same or higher priority than the verification code which runs in a platform or operating system of the local or remote hosts. In one embodiment, monitor application 102 may operate within storage device 104. In such an embodiment, monitor application 102 might be inaccessible to malware operating on a platform or operating system of the local or remote hosts. In a further embodiment, monitor application 102 may perform signature verification of updates to contents of storage device 104. Such updates may include, for example, updates to the operating system recovery image.

Monitor application 102 may perform signature verification of updates to contents of the storage device in several different ways. In one embodiment, monitor application 102 may be configured to allow users to allocate read-only regions in storage device 104. The read-only regions may include Trusted Software update and Recovery (TSR) regions. Also, the read-only regions may be outside of the user accessible logical block addressing (LBA) range on storage device 104. Furthermore, the read-only regions may be accessible through specific TSR functions or commands. The read-only regions might be written only through an authenticated update process. Otherwise, the read-only regions remain protected from any writes.

In another embodiment, monitor application 102 may associate a cryptographic key for each unique read-only region on storage device 104. Any suitable key may be used, such as a public key to be used as part of a public-key-private-key cryptographic scheme or exchange. A key may be assigned for each unique read-only region for authentication of future updates to a given unique read-only region. The key may be used to authenticate attempts to update the read-only regions. The authentication may verify updates to the read-only region. The key may verify a cryptographic signature of the incoming payload that is to be written to the read-only region.

In yet another embodiment, monitor application 102 may allocate an area within storage device 104 to be used for retaining an update image destined for one of the unique read-only regions. This area allocated for retaining the update image may be referred to as a candidate area. The image may be retained in the candidate area before authentication.

In still yet another embodiment, the identified maximum amount of storage that may be available for data storage, in terms of appearance to outside users such as the local and remote host, may be reduced to allocate the read-only regions. In a further embodiment, the identified maximum amount of storage may be reduced to allocate the candidate areas. The identified maximum amount of storage may be referred to as FACTORY-MAX. Monitor application 102 may control the amount of FACTORY-MAX as needed for allocating read-only and candidate areas.

In another embodiment, monitor application 102 may allow updates to read-only regions only upon authentication using a cryptographic authentication mechanism. Such a mechanism may be based upon, for example, the unique public key associated with a given read-only region. Furthermore, the mechanism may include asymmetric cryptography. The read-only regions might be located outside of user LBA range.

In yet another embodiment, monitor application 102 may control the ability to allocate or change the sizes of read-only regions. Such control over provisioning may be performed by, for example, physical presence. In another example, the control over provisioning may be based upon a modified Online Certificate Status Protocol (OCSP)-based provisioning mechanism. The choice in provisioning may be determined by, for example, a run-time state of platforms or operating systems of local host 116.

In still yet another embodiment, monitor application 102 may enforce security version numbering on contents of updates to the read-only regions. Accordingly, monitor application 102 may prevent rollback to previous updates or payloads written to storage. In another embodiment, monitor application 102 may lock support on read-only regions to provide authenticated read access control.

Monitor application 102 may receive requests to provision a read-only region of storage. This may be received during the boot or BIOS loading process. Monitor application 102 may require authentication of the requester through, for example, physical presence. Monitor application 102 may provision read-only regions, as well as a candidate area as big as the largest requested read-only region. Subsequently, the read-only regions can only be read by, and not written to, portions of the local or remote host. An additional request to write to or allocate further read-only regions in storage may be made through an OCSP-based request. If the request is authenticated, additional read-only regions may be allocated. If necessary, the candidate area may be increased to accommodate a new, largest read-only region. A unique public key may be stored for each read-only region. The public key may include, for example, a 2048-bit RSA key. Upon a request to update the contents of a read-only region, such as an operating system image stored therein, monitor application 102 may verify the request with a public-private key authentication. While authentication occurs and before the write is allowed, the contents to be written may be stored to the candidate area. If the authentication is successful, the contents of the candidate area may be written to the designated read-only region.

An OCSP-based request may be made to verify legitimacy of a public key that is sent to storage device 104, as storage device 104 might not natively determine whether the public key is legitimate. OCSP data may be sent to storage device 104 along with the public key. Storage device 104 might then check the OCSP data to determine whether the public key is legitimate and only allow writes to a read-only region if the public key is legitimate. OCSP data may be obtained, for example, from a remote server that is authorized to verify authenticity or legitimacy of a public key.

In some embodiments, monitor application 102 may be configured to be remotely controlled for updating. In such embodiments, storage device 104 may include its own power source and out-of-band wake-up and communication mechanisms with, for example, remote host 118. Monitor application 102 may operate, for example, in an Active Management Technology (AMT) layer. The AMT layer may include with PBA recovery and PBA management applications or functions. The AMT layer may communicate with an agent or handler communicatively coupled to a policy orchestrator. The policy orchestrator, running on, for example, a centralized server, may determine whether to reboot storage device 104 or perform recovery operations on storage device 104. These may include, for example, issuing data such as operating system images to be restored on to storage device 104. Communication may be made, for example, through a data exchange layer. The remote provisioning and restore may be made, for example, based upon a determination by information technology administrators that local host 116 and its storage device need to be restored to a known, safe configuration after a malware breach. Recovery images may be pro-actively stored in the read-only regions. AMT layers may be accessed out-of-band, or outside the purview of operating systems on the host.

Various portions of system 100 may include a processor communicatively coupled to a memory. In particular, monitor application 102 may execute on a portion of system 100, such as firmware of storage device 104, wherein monitor application 102 may include instructions loaded on a memory to be read and executed by the processor. For example, monitor application 102 may include instructions stored on a memory, such as FLASH, separate from storage in storage device 104 in a disk controller, for execution by a processor of storage device 104. Monitor application 102, when loaded and executed by the processor, may perform the functionality described in this disclosure.

Memory, such as memory 110, may be in the form of physical memory or pages of virtualized memory. Processors, such as processor 112, may comprise, for example, a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in memory. Memory may be configured in part or whole as application memory, system memory, or both. Memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100 may reside in memory for execution by the processor.

Figure 2:
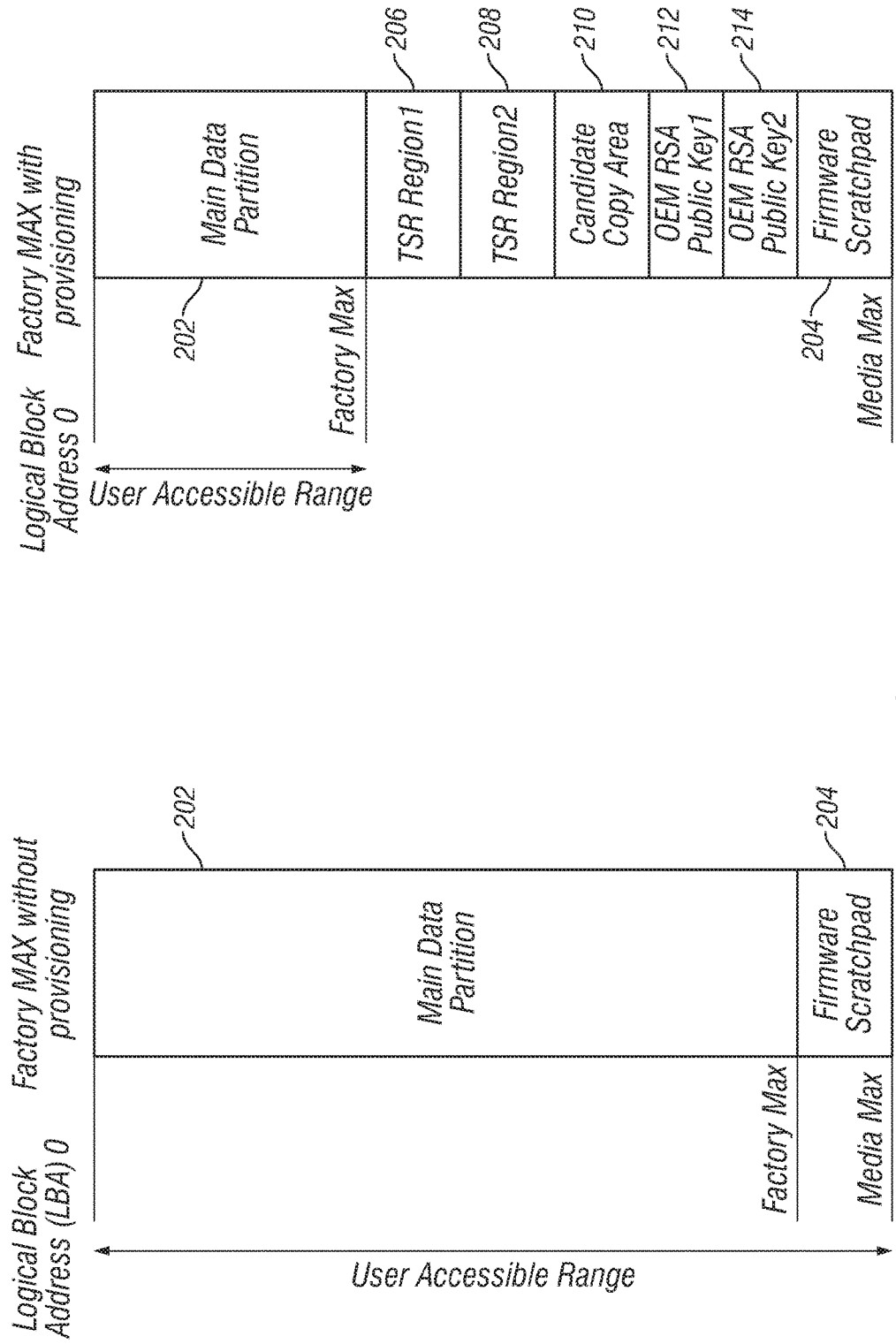
FIG. 2 illustrates example contents of a storage device 104 before and after monitor application has allocated various regions therein, according to embodiments of the present disclosure.

The processor may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, micro-instructions, or control signals which reflect the original code instruction. The processor may also include register renaming logic and scheduling logic, which generally allocate resources and queue the operation corresponding to the convert instruction for execution. After completion of execution of the operations specified by the code instructions, back end logic within the processor may retire the instruction. In one embodiment, the processor may allow out of order execution but requires in order retirement of instructions. Retirement logic within the processor may take a variety of forms as known to those of skill in the art (e.g., re-order buffers or the like). The processor cores of the processor are thus transformed during execution of the code, at least in terms of the output generated by the decoder, the hardware registers and tables utilized by the register renaming logic, and any registers modified by the execution logic FIG. 2 illustrates example contents of storage device 104 before and after monitor application has allocated various regions therein, according to embodiments of the present disclosure.

For example, before provisioning, the FACTORY-MAX amount of available space on storage device 104 may include a main data partition 202 that includes nearly all of the maximum media size of the storage, except for formatting overhead and space for a firmware scratchpad 204. Moreover, the user accessible range might include the entire main data partition. The user accessible range might also include firmware 106 scratchpad. The range shown in FIG. 2 may include a range of addresses from a logical address perspective.

After provisioning, the user accessible range may be limited to main data partition 202. The FACTORY-MAX may be set to the space needed for main data partition 202. In one embodiment, read-only regions, denoted in FIG. 2 as TSR Regions 206, 208, may be allocated into space formerly allocated to the main data partition as part of FACTORY-MAX. Two example read-only regions are shown, but any suitable number may be allocated. In another embodiment, a candidate copy area 210 may be allocated into space formerly allocated to the main data partition as part of FACTORY-MAX. Although a single such candidate area 210 is shown in FIG. 2, any suitable number or size of candidate areas 210 may be allocated. In yet another embodiment, public keys 212 corresponding to the read-only regions may be allocated into space formerly allocated to the main data partition as part of FACTORY-MAX. The keys may be, for example, set by an Original Equipment Manufacturer and be set, for example, for RSA encryption. A firmware scratchpad 204 may be retained.

Prior to provisioning, storage device 104 may provide a user accessible data area that is larger than the user accessible data area after provisioning. A user of storage device 104 may desire that provisioning by monitor application 102 may be latent until it is needed or otherwise activated. When provisioning has not occurred, an end user on the local or remote hosts may access nearly the full capacity of storage device 104. During provisioning, monitor application 102 may reduce the size of the user accessible LBA range in order to reserve space for a candidate copy location; the location may later receive data destined for a read-only region. In one embodiment, the candidate copy may be equal to the size of the largest read-only region. In addition to modifying the user accessible range, the provisioning process may make the LBA range assigned to each TSR region 206, 208 as read-only and assign and store a public key used to authenticate updates to each such region.

In one embodiment, to reduce the possibility of malware taking ownership of the read-only regions, monitor application 102 may require assertion of physical presence or the usage of a customized OCSP protocol when performing the provisioning or setup of read-only regions. Physical presence assertion may include provisioning the read-only region at BIOS run-time of the platform, or by asserting Physical presence Security ID (PSID) as used in the TCG Opal infrastructure.

Figure 3:
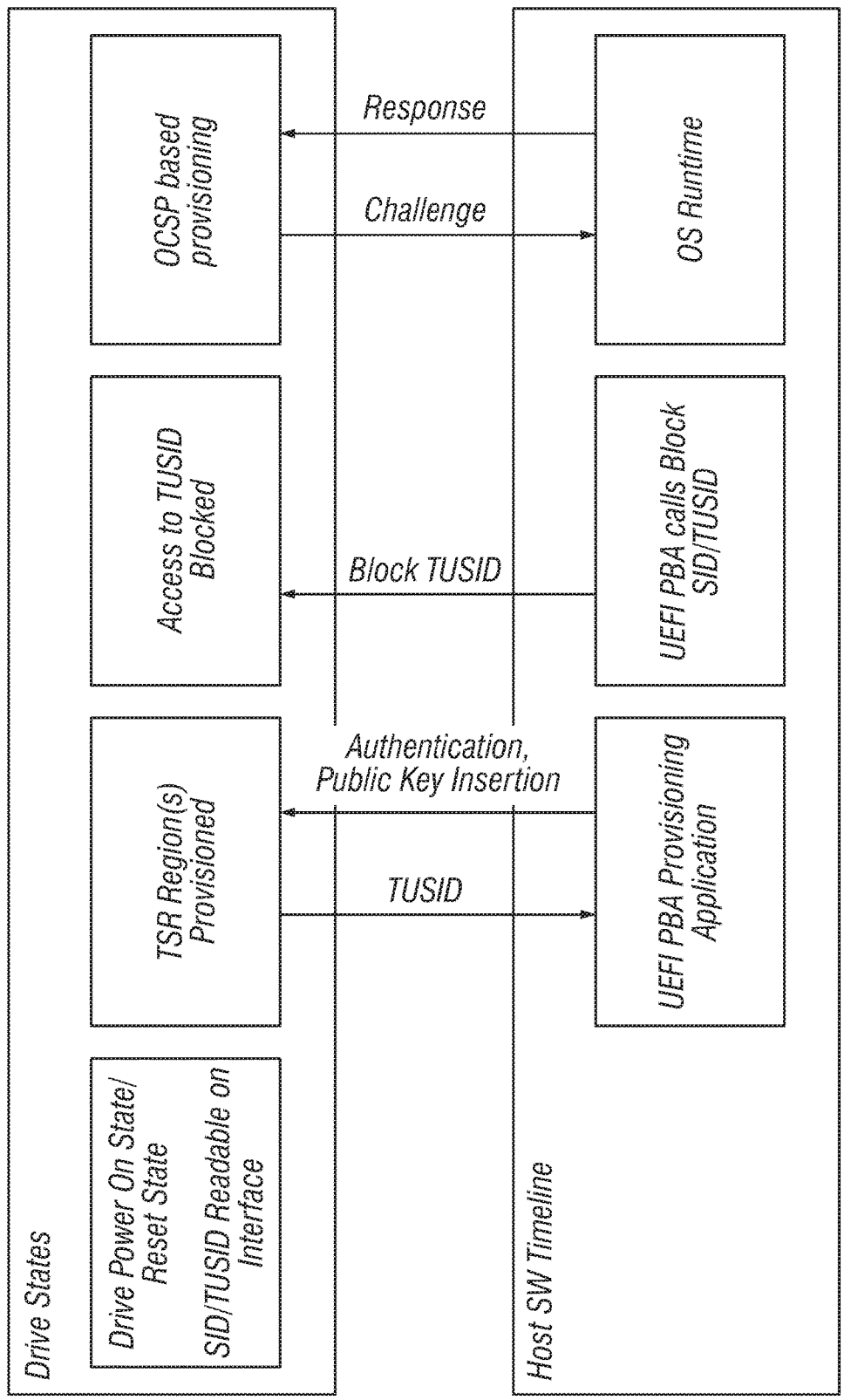
FIG. 3 illustrates usage models for provisioning mechanisms carried out by monitor application, in accordance with embodiments of the present disclosure.

FIG. 3 illustrates usage models for provisioning mechanisms carried out by monitor application 102, in accordance with embodiments of the present disclosure. Physical presence-based provisioning may be performed while an associated platform, such as operating systems of the local and remote hosts, are executing their BIOS/Pre-Boot Applications (PBA) phases. Upon a power-on or reset state, drives of storage device 104 may make a security identifier (SID or TUSID) available and readable on its interfaces. The TUSID may be fetched from the platform during its Unified Extensible Firmware Interface (UEFI) PBA provisioning application stage. In one embodiment, authentication may be performed between monitor application 102 and the platform (discussed in further detail below). This may implement first-come, first-served provisioning. Based upon commands received from an authenticated platform entity, monitor application 102 may allow read-only regions to be allocated and provisioned.

At the end of platform BIOS/Pre-boot applications, in one embodiment platform software 404 may use a command to call to monitor application 102 and storage device to block additional, further physical presence. This may be denoted as BlockTUSID. This may prevent any subsequent software, including operating system runtime malware, from taking ownership of additional, unprovisioned read-only regions.

Subsequently, after boot and during runtime, it may be desired to provision additional read-only regions. In one embodiment, such runtime provisions may be accomplished by an OCSP provisioning mechanism. This may include issuance of a challenge, for which the runtime entity requesting the additional read-only regions may provide a response. If the response is correct, given the challenge, then the additional allocation may be made.

Figure 4:
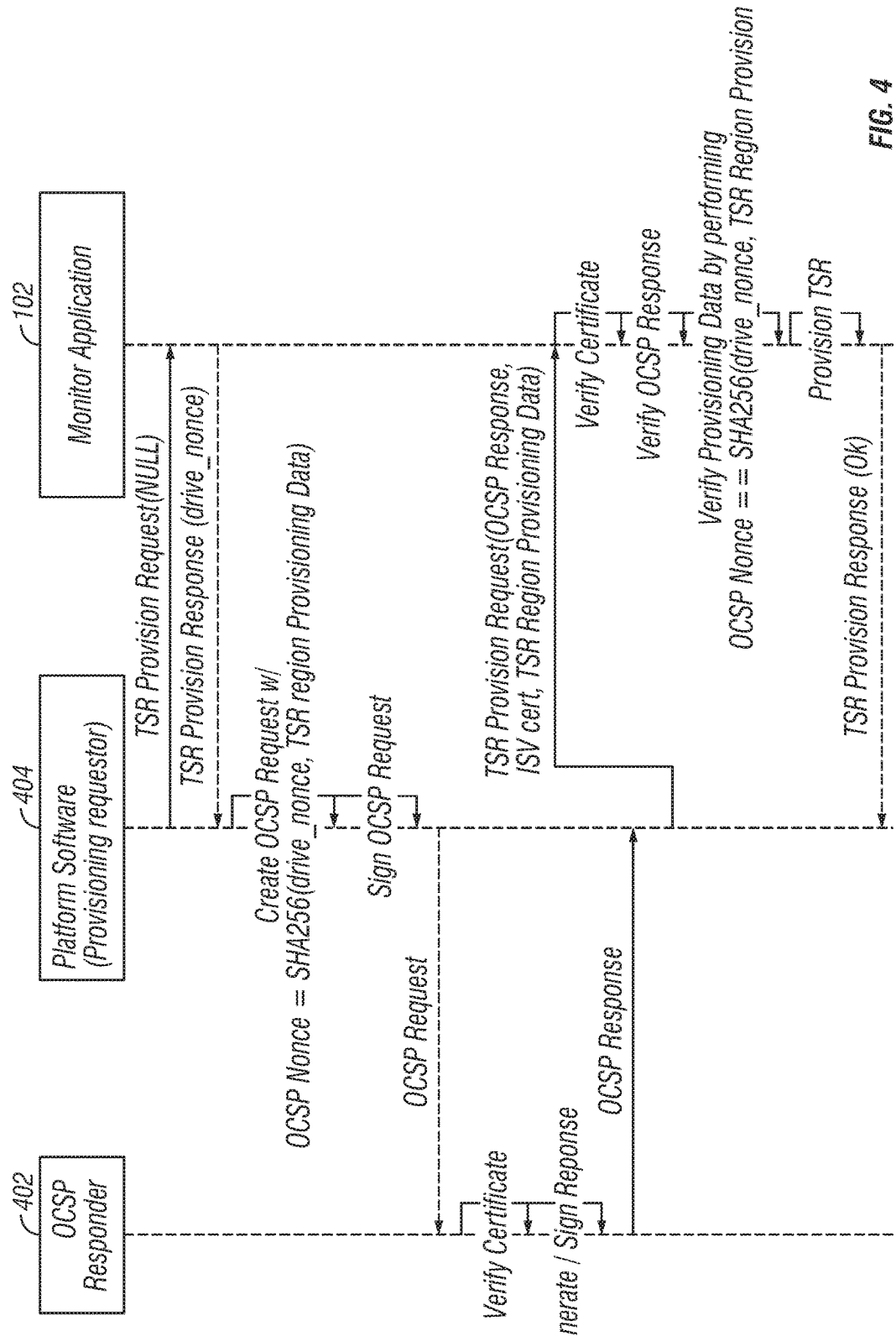
FIG. 4 is an illustration of a modified provisioning mechanism to be called by platform software, according to embodiments of the present disclosure.

FIG. 4 is an illustration of a modified OCSP based provisioning mechanism to be called by platform software in either the BIOS/Pre-boot or operating system runtime environments, according to embodiments of the present disclosure. The modifications may be made, for example, to the protocols of RFC 6960 OCSP. Shown in FIG. 4 are operations to be performed by an OCSP authenticator (OCSP Responder 402), a requestor of the provisioning (such as an element on the local or remote hosts), and monitor application 102. The OCSP authenticator may be operating on, for example, the local or remote hosts.

A platform software component 404, such as an operating system, may request after BIOS setup that a new read-only region be allocated in storage device 104. In response, in one embodiment monitor application 102 may return a nonce corresponding to the drive. The nonce may be randomly generated. In return, in another embodiment platform software 404 may create an OCSP request, wherein the OCSP nonce used for the request is based upon a secured hash algorithm using the drive nonce and the data to be provisioned to the read-only region. The drive nonce and read-only provisioning data may be incorporated into a single hash which is then inserted into the OCSP Request for signing. The request may be signed and issued to the OCSP responder 402, which may verify a certificate of platform software 404 and generate and sign an OCSP response.

In one embodiment, platform software 404 may issue a read-only region provision request to monitor application 102. The request may include as parameters the OCSP response signed by OCSP responder 402. Furthermore, the parameters may include the data about how to provision the read-only region as well as other security credentials, such as an independent software vendor (ISV) certificate. Monitor application 102 may verify the certificate and the OCSP response.

In one embodiment, monitor application 102 may verify provisioning data by performing a check whether the nonce of the OCSP equals the result of the same secured hash algorithm applied to the drive nonce and the read-only region provisioning data. Monitor application 102 may verify the OCSP nonce in the OCSP Response payload by hashing the original drive nonce (retained by monitor application 102) and the read-only region provisioning data and comparing resultant hash against the OCSP nonce contained in the signed OCSP Response. If the data is verified, the read-only region may be provisioned and an appropriate response issued to platform software 404.

After provisioning, all updates to the read-only regions may require asymmetric signature verification by monitor application 102 using the public key assigned to the read-only region. These might occur during any platform runtime environment, provided that the drive is still powered. Failed update attempts to a read-only region, such as via signature verification failure, security version number rollback, power loss, etc., might not disturb the current contents of the read-only region because updates are contained in the candidate area prior to successful authentication.

Figure 5:
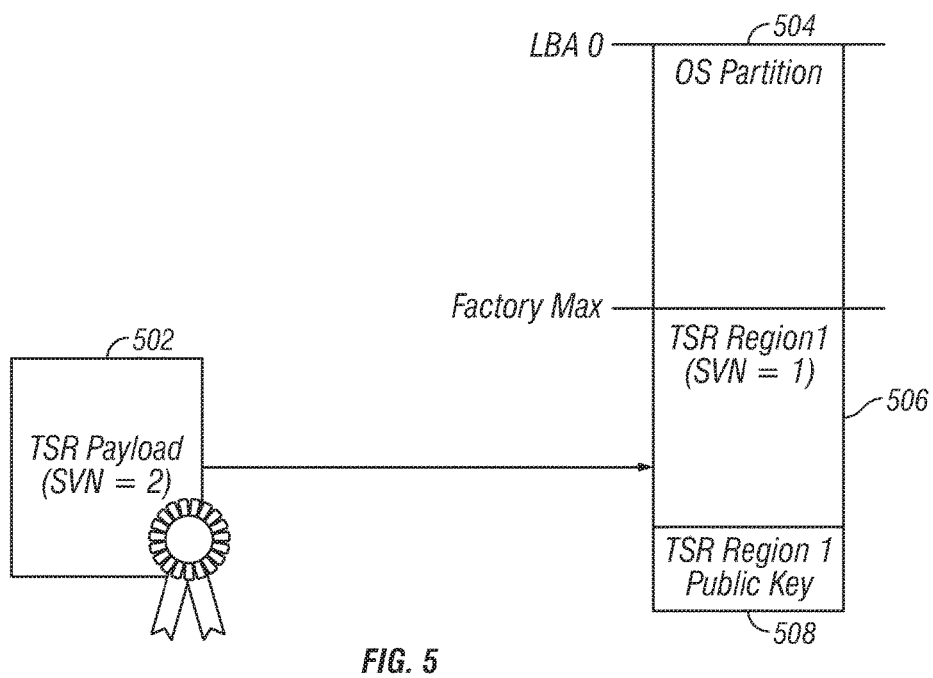
FIG. 5 illustrates example authenticated writes to a read-only region, according to embodiments of the present disclosure.

FIG. 5 illustrates example authenticated writes to a read-only region, according to embodiments of the present disclosure. If the storage of storage device 104 includes a read-only region (denoted by TSR 506) and an associated public key 508, the public key may be used in an RSA-based asymmetric encryption of the data included in the read-only region.

The data destined to be written to the read-only region 506 may be signed using a private key corresponding to public key 508. Monitor application 102 may return the public key 508 to the entity causing the write, which may then use the public key to sign the data 502. The data 502 may be written to the read-only region 506 after being copied from the candidate area. Accordingly, in one embodiment monitor application 102 may provide read access control or locking of the contents of the read-only region. This signing may be selectively enabled or disabled. Read-locking may be useful when storing sensitive information. Read-locking may be enabled using authentication to verify that an entity making a read is authorized to read the data.

In other examples, the data may be encrypted using a key. A host may encrypt the data, sign the data, and send it to be written to the read-only region. To make use of the data another host might read the encrypted data from the read-only region, decrypt the data, and then use the data. In some examples, the host might send a key for encrypting the data to monitor application 102 as part of the provisioning process. Then, the monitoring application might decrypt the data itself and apply it for use, once the host sends an appropriate command to do so.

In one embodiment, the payload to be written to the candidate area and subsequently to the read-only region may be required to be signed according to an algorithm associated with a security version. For example, it may be signed using an RSA base signing algorithm such as defined in PKCS #1, v.2.1 or any other suitable crytographic signature verification scheme. In another embodiment, the payload may be required to be signed with a security version that is greater or equal to a threshold security version designated for the read-only region.

Figure 6:
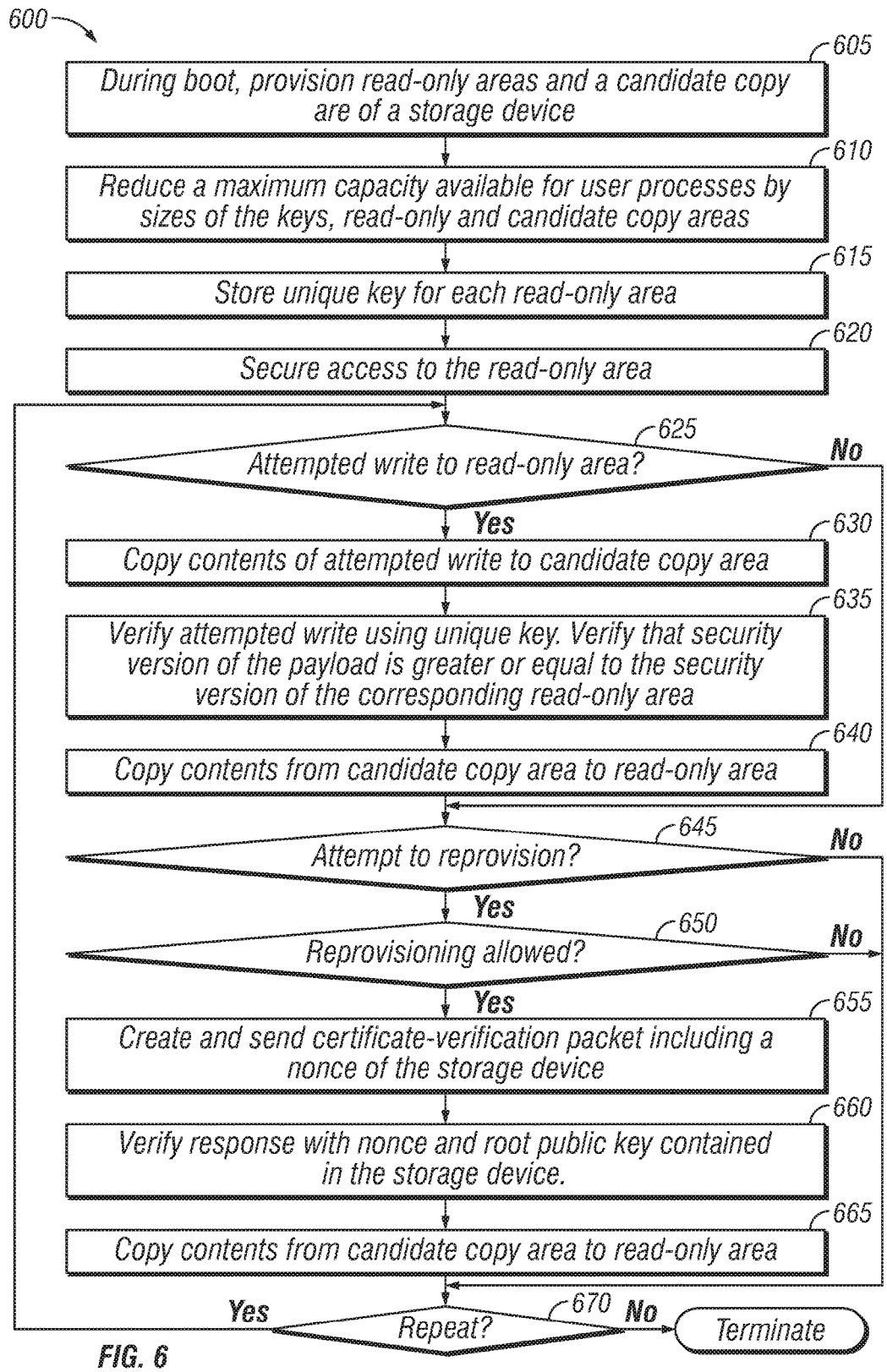
FIG. 6 illustrates an example method for writing to storage devices, according to embodiments of the present disclosure.

FIG. 6 illustrates a flow diagram of an example embodiment of a method 600 for remote provisioning and authenticated writes, according to embodiments of the present disclosure. Method 600 may be implemented by any of the elements of FIGS. 1-5 shown above. The steps of method 600 may begin at any suitable point, including 505. Furthermore, the steps of method 600 may be optionally repeated, looped, recursively executed, executed in various order, or omitted as necessary. Different steps of method 600 may be executed in parallel with other steps of method 600. In additional, further steps may be executed during execution of method 600, wherein such further steps are not shown in FIG. 5 but are described with respect to FIGS. 1-4 or would be apparent to one of skill. Execution of method 600 may be performed entirely or in part by execution of instructions from a memory by a processor.

At 605, from firmware and during boot of storage device, areas for unique keys, read-only data, and for a candidate copy may be provisioned. At 610, the provisioning may reduce the available size for user data. At 615, a unique key for each read-only area may be stored. At 620, access to the read-only areas may be secured At 625, it may be determined whether there has been an attempted write to the read-only areas. If so, method 600 may proceed to 630. If not, method 600 may proceed to 645. At 630, contents of the attempted write may be copied to the candidate copy area. At 635, the attempt may be verified using public-private key exchanges or other authentication procedures. The attempt may be verified by comparing security versions of the payload to be written versus security versions of the data of the read-only area. If the security version of the payload is newer, or greater, than the data to be written, then the write may be allowed. Otherwise, it may be denied. At 640, the contents may be copied from the candidate copy area to the read-only area based upon the authentications and verifications.

At 645, it may be determined whether there has been an attempt to reprovision the storage after boot. If so, method 600 may proceed to 650. Otherwise, method 600 may proceed to 670. At 650, it may be determined whether reprovisioning is allowed as a policy for the storage. If so, method 600 may proceed to 655. Otherwise, method 600 may proceed to 670. At 655, a certificate-verification packet including a nonce of the storage device may be created and sent to a verification authority or to an attempted reprovisioner. At 660, a verification response may be received. It may be determined whether the response identifies the source of the attempted write and reprovision. The data may be verified using the nonce and root public key stored in the device. If the data and the source are authenticated, then at 664 contents may be copied from candidate copy area to read-only area. Storage may be reprovisioned.

At 670, it may be determined whether method 600 will repeat at, for example, 625, or terminate.

Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. Methods may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

Embodiments of the present disclosure include at least one non-transitory machine readable storage medium. The medium may comprise computer-executable instructions carried on the machine readable medium. The instructions may readable by a processor. The instructions, when read and executed, may cause the processor to, in firmware of a storage device, provision one or more read-only areas of the storage device. In combination with any of the above embodiments, the instructions may further cause the processor to provision a candidate copy area of the storage device. In combination with any of the above embodiments, the instructions may further cause the processor to reduce a maximum capacity available for user processes or data on the storage device by a size of the read-only areas and the candidate copy area. In combination with any of the above embodiments, the instructions may further cause the processor to secure access to the read-only areas of the storage device. In combination with any of the above embodiments, the instructions may further cause the processor to determine that an attempted write to one of the read-only areas has been made. In combination with any of the above embodiments, the instructions may further cause the processor to copy contents of the attempted write to the candidate copy area. In combination with any of the above embodiments, the instructions may further cause the processor to verify the attempted write. In combination with any of the above embodiments, the instructions may further cause the processor to, based on a verification of the attempted write, copy the contents from the candidate copy area to the read-only area. In combination with any of the above embodiments, the candidate area may be as large as a largest of the read-only areas. In combination with any of the above embodiments, the instructions may further cause the processor to store a unique key in the storage device for each read-only area. In combination with any of the above embodiments, the instructions may further cause the processor to further reduce a maximum capacity available for user processes or data on the storage device by a size of the unique keys. In combination with any of the above embodiments, the instructions may further cause the processor to store a unique key in the storage device for each read-only area. In combination with any of the above embodiments, the instructions may further cause the processor to further reduce a maximum capacity available for user processes or data on the storage device by a size of the unique keys. In combination with any of the above embodiments, the instructions may further cause the processor to receive an attempted write for one of the read-only areas. In combination with any of the above embodiments, the instructions may further cause the processor to, based upon a verification of a signature of data to be written to the read-only area using a unique key associated with the read-only area, allow the attempted write. In combination with any of the above embodiments, the instructions may further cause the processor to provision the read-only areas of the storage device is performed during a boot process of the storage device. In combination with any of the above embodiments, the instructions may further cause the processor to, upon provisioning the read-only areas, block further provisioning based upon a blocking instruction from an entity specifying the provisioning. In combination with any of the above embodiments, the instructions may further cause the processor to, after provisioning the read-only areas of the storage device, determine an attempted write of a read-only area of the storage device from an operating-system-based entity. In combination with any of the above embodiments, the instructions may further cause the processor to create and send a certificate-verification packet including a nonce of the storage device. In combination with any of the above embodiments, the instructions may further cause the processor to receive a verification response to the certificate-verification packet. In combination with any of the above embodiments, the instructions may further cause the processor to determine that the verification response identifies the source of the attempted write. In combination with any of the above embodiments, the instructions may further cause the processor to verify the verification response based upon the nonce of the storage device. In combination with any of the above embodiments, the instructions may further cause the processor to, after provisioning the read-only areas of the storage device, determine an attempted write of a read-only area of the storage device from an operating-system-based entity. In combination with any of the above embodiments, the instructions may further cause the processor to create and send a certificate-verification packet including a nonce of the storage device. In combination with any of the above embodiments, the instructions may further cause the processor to receive a verification response to the certificate-verification packet. In combination with any of the above embodiments, the instructions may further cause the processor to verify data to be written based upon a validation using the nonce of the storage device. In combination with any of the above embodiments, the instructions may further cause the processor to determine that an attempted write to one of the read-only areas has been made. In combination with any of the above embodiments, the instructions may further cause the processor to copy contents of the attempted write to the candidate copy area. In combination with any of the above embodiments, the instructions may further cause the processor to compare a security version of a payload to be written with a security version of a corresponding read-only area. In combination with any of the above embodiments, the instructions may further cause the processor to verify the attempted write by determining that the security version of the payload is greater or equal to the security version of the corresponding read-only area. In combination with any of the above embodiments, the instructions may further cause the processor to, based on a verification of the attempted write, copy the contents from the candidate copy area to the read-only area.

Embodiments of the present disclosure include a system for securing electronic devices. The system may include a storage device including a storage device controller processor, at least one non-transitory machine readable storage medium in firmware of the storage device communicatively coupled to the storage device controller processor, and a monitor application comprising computer-executable instructions on the medium. The instructions may be readable by the storage device controller processor. The monitor application may be configured to, in firmware of a storage device, provision one or more read-only areas of the storage device. In combination with any of the above embodiments, the application may be further configured to provision a candidate copy area of the storage device. In combination with any of the above embodiments, the application may be further configured to reduce a maximum capacity available for user processes or data on the storage device by a size of the read-only areas and the candidate copy area. In combination with any of the above embodiments, the instructions may further cause the processor to secure access to the read-only areas of the storage device. In combination with any of the above embodiments, the application may be further configured to determine that an attempted write to one of the read-only areas has been made. In combination with any of the above embodiments, the application may be further configured to copy contents of the attempted write to the candidate copy area. In combination with any of the above embodiments, the instructions may further cause the processor to verify the attempted write. In combination with any of the above embodiments, the instructions may further cause the processor to, based on a verification of the attempted write, copy the contents from the candidate copy area to the read-only area. In combination with any of the above embodiments, the candidate area may be as large as a largest of the read-only areas. In combination with any of the above embodiments, the application may be further configured to store a unique key in the storage device for each read-only area. In combination with any of the above embodiments, the application may be further configured to further reduce a maximum capacity available for user processes or data on the storage device by a size of the unique keys. In combination with any of the above embodiments, the application may be further configured to store a unique key in the storage device for each read-only area. In combination with any of the above embodiments, the application may be further configured to further reduce a maximum capacity available for user processes or data on the storage device by a size of the unique keys. In combination with any of the above embodiments, the application may be further configured to receive an attempted write for one of the read-only areas. In combination with any of the above embodiments, the instructions may further cause the processor to, based upon a verification of a signature of data to be written to the read-only area using a unique key associated with the read-only area, allow the attempted write. In combination with any of the above embodiments, the application may be further configured to provision the read-only areas of the storage device are performed during a boot process of the storage device. In combination with any of the above embodiments, the instructions may further cause the processor to, upon provisioning the read-only areas, block further provisioning based upon a blocking instruction from an entity specifying the provisioning. In combination with any of the above embodiments, the instructions may further cause the processor to, after provisioning the read-only areas of the storage device, determine an attempted write of a read-only area of the storage device from an operating-system-based entity. In combination with any of the above embodiments, the application may be further configured to create and send a certificate-verification packet including a nonce of the storage device. In combination with any of the above embodiments, the application may be further configured to receive a verification response to the certificate-verification packet. In combination with any of the above embodiments, the application may be further configured to determine that the verification response identifies the source of the attempted write. In combination with any of the above embodiments, the application may be further configured to verify the verification response based upon the nonce of the storage device. In combination with any of the above embodiments, the instructions may further cause the processor to, after provisioning the read-only areas of the storage device, determine an attempted write of a read-only area of the storage device from an operating-system-based entity. In combination with any of the above embodiments, the application may be further configured to create and send a certificate-verification packet including a nonce of the storage device. In combination with any of the above embodiments, the application may be further configured to receive a verification response to the certificate-verification packet. In combination with any of the above embodiments, the application may be further configured to verify data to be written based upon a validation using the nonce of the storage device. In combination with any of the above embodiments, the application may be further configured to determine that an attempted write to one of the read-only areas has been made. In combination with any of the above embodiments, the instructions may further cause the processor to copy contents of the attempted write to the candidate copy area. In combination with any of the above embodiments, the application may be further configured to compare a security version of a payload to be written with a security version of a corresponding read-only area. In combination with any of the above embodiments, the application may be further configured to verify the attempted write by determining that the security version of the payload is greater or equal to the security version of the corresponding read-only area. In combination with any of the above embodiments, the instructions may further cause the processor to, based on a verification of the attempted write, copy the contents from the candidate copy area to the read-only area.

Embodiments of the present disclosure include a method for securing electronic devices. The method may include, in firmware of a storage device, provisioning one or more read-only areas of the storage device. In combination with any of the above embodiments, the method may further include provisioning a candidate copy area of the storage device. In combination with any of the above embodiments the method may further include reducing a maximum capacity available for user processes or data on the storage device by a size of the read-only areas and the candidate copy area. In combination with any of the above embodiments, the method may further include securing access to the read-only areas of the storage device. In combination with any of the above embodiments, the application may the method may further include determining that an attempted write to one of the read-only areas has been made. In combination with any of the above embodiments, the method may further include copying contents of the attempted write to the candidate copy area. In combination with any of the above embodiments, the method may further include verifying the attempted write. In combination with any of the above embodiments, the method may further include, based on a verification of the attempted write, copying the contents from the candidate copy area to the read-only area. In combination with any of the above embodiments, the candidate area may be as large as a largest of the read-only areas. In combination with any of the above embodiments, the method may further include storing a unique key in the storage device for each read-only area. In combination with any of the above embodiments, the method may further include further reducing a maximum capacity available for user processes or data on the storage device by a size of the unique keys. In combination with any of the above embodiments, the method may further include storing a unique key in the storage device for each read-only area. In combination with any of the above embodiments, the method may further include further reducing a maximum capacity available for user processes or data on the storage device by a size of the unique keys. In combination with any of the above embodiments, the method may further include receiving an attempted write for one of the read-only areas. In combination with any of the above embodiments, the method may further include, based upon a verification of a signature of data to be written to the read-only area using a unique key associated with the read-only area, allowing the attempted write. In combination with any of the above embodiments, the method may further include provisioning the read-only areas of the storage device are performed during a boot process of the storage device. In combination with any of the above embodiments, the method may further include, upon provisioning the read-only areas, blocking further provisioning based upon a blocking instruction from an entity specifying the provisioning. In combination with any of the above embodiments, the method may further include, after provisioning the read-only areas of the storage device, determining an attempted write of a read-only area of the storage device from an operating-system-based entity. In combination with any of the above embodiments, the method may further include creating and sending a certificate-verification packet including a nonce of the storage device. In combination with any of the above embodiments, the method may further include receiving a verification response to the certificate-verification packet. In combination with any of the above embodiments, the method may further include determining that the verification response identifies the source of the attempted write. In combination with any of the above embodiments, the method may further include verifying the verification response based upon the nonce of the storage device. In combination with any of the above embodiments, the method may further include, after provisioning the read-only areas of the storage device, determining an attempted write of a read-only area of the storage device from an operating-system-based entity. In combination with any of the above embodiments, the method may further include creating and sending a certificate-verification packet including a nonce of the storage device. In combination with any of the above embodiments, the method may further include receiving a verification response to the certificate-verification packet. In combination with any of the above embodiments, the method may further include verifying data to be written based upon a validation using the nonce of the storage device. In combination with any of the above embodiments, the method may further include determining that an attempted write to one of the read-only areas has been made. In combination with any of the above embodiments, the method may further include copying contents of the attempted write to the candidate copy area. In combination with any of the above embodiments the method may further include comparing a security version of a payload to be written with a security version of a corresponding read-only area. In combination with any of the above embodiments, the method may further include verifying the attempted write by determining that the security version of the payload is greater or equal to the security version of the corresponding read-only area. In combination with any of the above embodiments, the method may further include, based on a verification of the attempted write, copying the contents from the candidate copy area to the read-only area.

Embodiments of the present disclosure include an apparatus for securing electronic devices. The apparatus may include means for, in firmware of a storage device, provisioning one or more read-only areas of the storage device. In combination with any of the above embodiments, the apparatus may include means for provisioning a candidate copy area of the storage device. In combination with any of the above embodiments the apparatus may include means for reducing a maximum capacity available for user processes or data on the storage device by a size of the read-only areas and the candidate copy area. In combination with any of the above embodiments, the apparatus may include means for securing access to the read-only areas of the storage device. In combination with any of the above embodiments, the application may the apparatus may include means for determining that an attempted write to one of the read-only areas has been made. In combination with any of the above embodiments, the apparatus may include means for copying contents of the attempted write to the candidate copy area. In combination with any of the above embodiments, the apparatus may include means for verifying the attempted write. In combination with any of the above embodiments, the apparatus may include means for, based on a verification of the attempted write, copying the contents from the candidate copy area to the read-only area. In combination with any of the above embodiments, the candidate area may be as large as a largest of the read-only areas. In combination with any of the above embodiments, the apparatus may include means for storing a unique key in the storage device for each read-only area. In combination with any of the above embodiments, the apparatus may include means for further reducing a maximum capacity available for user processes or data on the storage device by a size of the unique keys. In combination with any of the above embodiments, the apparatus may include means for storing a unique key in the storage device for each read-only area. In combination with any of the above embodiments, the apparatus may include means for further reducing a maximum capacity available for user processes or data on the storage device by a size of the unique keys. In combination with any of the above embodiments, the apparatus may include means for receiving an attempted write for one of the read-only areas. In combination with any of the above embodiments, the apparatus may include means for, based upon a verification of a signature of data to be written to the read-only area using a unique key associated with the read-only area, allowing the attempted write. In combination with any of the above embodiments, the apparatus may include means for provisioning the read-only areas of the storage device is performed during a boot process of the storage device. In combination with any of the above embodiments, the apparatus may include means for, upon provisioning the read-only areas, blocking further provisioning based upon a blocking instruction from an entity specifying the provisioning. In combination with any of the above embodiments, the apparatus may include means for, after provisioning the read-only areas of the storage device, determining an attempted write of a read-only area of the storage device from an operating-system-based entity. In combination with any of the above embodiments, the apparatus may include means for creating and sending a certificate-verification packet including a nonce of the storage device. In combination with any of the above embodiments, the apparatus may include means for receiving a verification response to the certificate-verification packet. In combination with any of the above embodiments, the apparatus may include means for determining that the verification response identifies the source of the attempted write. In combination with any of the above embodiments, the apparatus may include means for verifying the verification response based upon the nonce of the storage device. In combination with any of the above embodiments, the apparatus may include means for, after provisioning the read-only areas of the storage device, determining an attempted write of a read-only area of the storage device from an operating-system-based entity. In combination with any of the above embodiments, the apparatus may include means for creating and sending a certificate-verification packet including a nonce of the storage device. In combination with any of the above embodiments, the apparatus may include means for receiving a verification response to the certificate-verification packet. In combination with any of the above embodiments, the apparatus may include means for verifying data to be written based upon a validation using the nonce of the storage device. In combination with any of the above embodiments, the apparatus may include means for determining that an attempted write to one of the read-only areas has been made. In combination with any of the above embodiments, the apparatus may include means for copying contents of the attempted write to the candidate copy area. In combination with any of the above embodiments the apparatus may include means for comparing a security version of a payload to be written with a security version of a corresponding read-only area. In combination with any of the above embodiments, the apparatus may include means for verifying the attempted write by determining that the security version of the payload is greater or equal to the security version of the corresponding read-only area. In combination with any of the above embodiments, the apparatus may include means for, based on a verification of the attempted write, copying the contents from the candidate copy area to the read-only area.

Although the present disclosure has been described in detail, it should be understood that various changes, substitutions, and alterations can be made hereto without departing from the spirit and the scope of the disclosure as defined by the appended claims.

What is claimed is:

1. At least one non-transitory machine-readable storage medium, comprising computer-executable instructions carried on the machine-readable medium, the instructions readable by a hardware processor, the instructions, when read and executed, for causing the hardware processor to:
   provision one or more read-only areas of a storage device;
   provision a candidate copy area of the storage device;
   secure access to the read-only areas of the storage device;
   determine that an attempted write to one of the read-only areas has been made;
   copy contents of the attempted write to the candidate copy area;
   verify a signature of data to be written to the read-only area using a unique key associated with the read-only area; and
   in response to verifying the signature of the data to be written to the read-only area using the unique key associated with the read-only area, copy the contents from the candidate copy area to the read-only area.

2. The non-transitory machine-readable storage medium of claim 1, wherein the candidate area is as large as a largest of the read-only areas.

3. The non-transitory machine-readable storage medium of claim 1, further comprising instructions for causing the hardware processor to:
provision one or more key storage areas in which to store the unique keys associated with the one or more read-only areas.

4. The non-transitory machine-readable storage medium of claim 1, further comprising instructions for causing the hardware processor to:
provision the read-only areas of the storage device is performed during a boot process of the storage device; and
upon provisioning the read-only areas, block further provisioning based upon a blocking instruction from an entity specifying the provisioning.

5. The non-transitory machine-readable storage medium of claim 1, further comprising instructions for causing the hardware processor to:
determine an attempted provisioning of a read-only area of the storage device;
create and send a certificate-verification packet including a nonce of the storage device;
receive a verification response to the certificate-verification packet;
determine that the verification response identifies the source of the attempted provisioning; and
verify the verification response based upon the nonce of the storage device.

6. The non-transitory machine-readable storage medium of claim 1, further comprising instructions for causing the hardware processor to:
after provisioning the read-only areas of the storage device, determine an attempted provisioning of a read-only area of the storage device; and
verify data to be written based upon a validation using a key contained within the provisioning data.

7. The non-transitory machine-readable storage medium of claim 1, further comprising instructions for causing the hardware processor to:
determine that a second attempted write to one of the read-only areas has been made;
copy contents of the second attempted write to the candidate copy area;
compare a security version of a second payload to be written with a security version of a corresponding read-only area;
verify the second attempted write by determining that the security version of the payload is greater or equal to the security version of the corresponding read-only area; and
based on a verification of the second attempted write, copy the contents from the candidate copy area to the read-only area.

8. A system for securing electronic devices, comprising:
a storage device including at least one non-transitory machine-readable storage medium;
a hardware processor coupled to the storage device and configured to:
provision one or more read-only areas of the storage device;
provision a candidate copy area of the storage device;
secure access to the read-only areas of the storage device;
determine that an attempted write to one of the read-only areas has been made;
copy contents of the attempted write to the candidate copy area;
verify a signature of data to be written to the read-only area using a unique key associated with the read-only area; and
in response to verifying the signature of the data to be written to the read-only area using the unique key associated with the read-only area, copy the contents from the candidate copy area to the read-only area.

9. The system of claim 8, wherein the candidate area is as large as a largest of the read-only areas.

10. The system of claim 8, wherein the hardware processor is further configured to:
provision one or more key storage areas in which to store the unique keys associated with the one or more read-only areas.

11. The system of claim 8, wherein the hardware processor is further configured to:
provision the read-only areas of the storage device is performed during a boot process of the storage device; and
upon provisioning the read-only areas, block further provisioning based upon a blocking instruction from an entity specifying the provisioning.

12. The system of claim 8, wherein the hardware processor is further configured to:
determine an attempted provisioning of a read-only area of the storage device;
create and send a certificate-verification packet including a nonce of the storage device;
receive a verification response to the certificate-verification packet;
determine that the verification response identifies the source of the attempted provisioning; and
verify the verification response based upon the nonce of the storage device.

13. The system of claim 8, wherein the hardware processor is further configured to:
after provisioning the read-only areas of the storage device, determine an attempted provisioning of a read-only area of the storage device; and
verify data to be written based upon a validation using a key contained within the provisioning data.

14. The system of claim 8, wherein the hardware processor is further configured to:
determine that a second attempted write to one of the read-only areas has been made;
copy contents of the second attempted write to the candidate copy area;
compare a security version of a second payload to be written with a security version of a corresponding read-only area;
verify the second attempted write by determining that the security version of the payload is greater or equal to the security version of the corresponding read-only area; and
based on a verification of the second attempted write, copy the contents from the candidate copy area to the read-only area.

15. A method of electronic device security, comprising:
provisioning one or more read-only areas of the storage device using a hardware processor;
provisioning a candidate copy area of the storage device;
securing access to the read-only areas of the storage device;
determining that an attempted write to one of the read-only areas has been made;
copying contents of the attempted write to the candidate copy area;

verifying a signature of data to be written to the read-only area using a unique key associated with the read-only area; and in response to verifying the signature of the data to be written to the read-only area using the unique key associated with the read-only area, copying the contents from the candidate copy area to the read-only area.

16. The method of claim 15, further comprising:
provisioning one or more key storage areas in which to store the unique keys associated with the one or more read-only areas.

17. The method of claim 15, further comprising:
provisioning the read-only areas of the storage device is performed during a boot process of the storage device; and
upon provisioning the read-only areas, blocking further provisioning based upon a blocking instruction from an entity specifying the provisioning.

18. The method of claim 15, further comprising:
determining an attempted provisioning of a read-only area of the storage device;
creating and sending a certificate-verification packet including a nonce of the storage device;
receiving a verification response to the certificate-verification packet;
determining that the verification response identifies the source of the attempted provisioning; and
verifying the verification response based upon the nonce of the storage device.

19. The method of claim 15, further comprising:
after provisioning the read-only areas of the storage device, determining an attempted provisioning of a read-only area of the storage device; and
verifying data to be written based upon a validation using a key contained within the provisioning data.

20. The method of claim 15, further comprising:
determining that a second attempted write to one of the read-only areas has been made;
   copying contents of the second attempted write to the candidate copy area;
   comparing a security version of a second payload to be written with a security version of a corresponding read-only area;
verifying the second attempted write by determining that the security version of the payload is greater or equal to the security version of the corresponding read-only area; and
   based on a verification of the second attempted write, coping the contents from the candidate copy area to the read-only area.

* * * * *

UNITED STATES PATENT AND TRADEMARK OFFICE
CERTIFICATE OF CORRECTION

PATENT NO. : 10,482,278 B2
APPLICATION NO. : 16/297315
DATED : November 19, 2019
INVENTOR(S) : Adrian R. Pearson et al.

It is certified that error appears in the above-identified patent and that said Letters Patent is hereby corrected as shown below:

In the Claims

On Column 20, Claim 20, Line 24:
"coping the contents from the candidate copy area"
Should be:
--copying the contents from the candidate copy area--

Signed and Sealed this
Fifth Day of March, 2024

Katherine Kelly Vidal
*Director of the United States Patent and Trademark Office*